Figure 8:
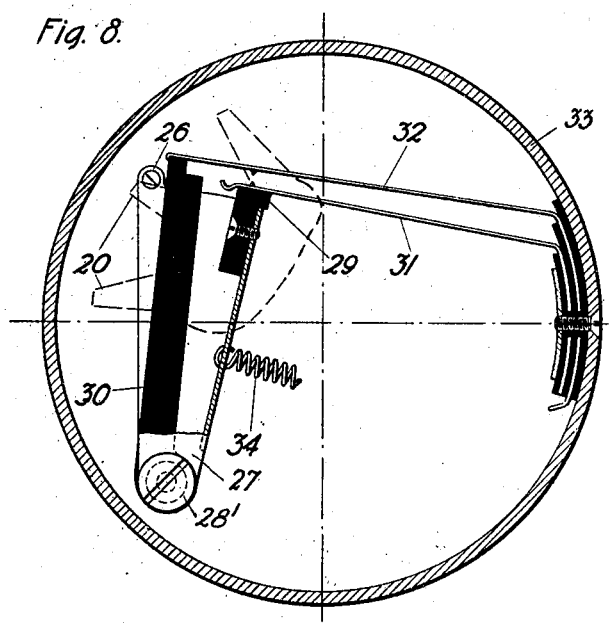
Figure 10:
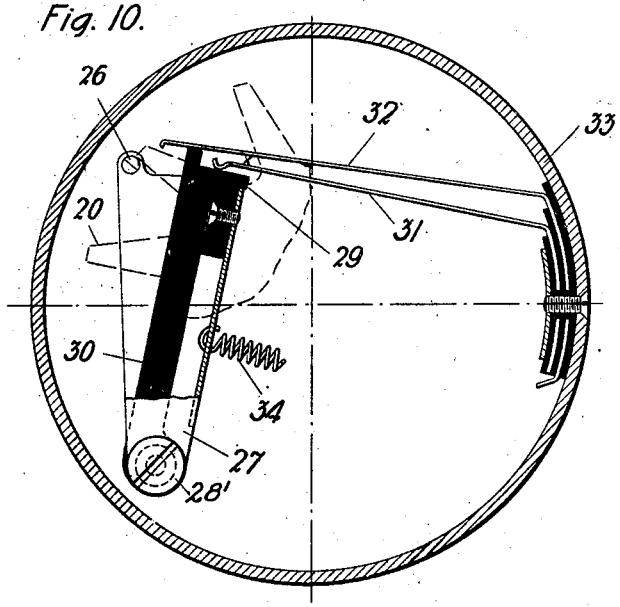

F. R. McBERTY & A. H. ADAMS.
IMPULSE SENDING MECHANISM.
APPLICATION FILED DEC. 19, 1913.

1,127,050.

Patented Feb. 2, 1915.

5 SHEETS—SHEET 5.

Witnesses:

Inventor:
Frank R. McBerty
Arthur H Adams
by _____, Att'y.

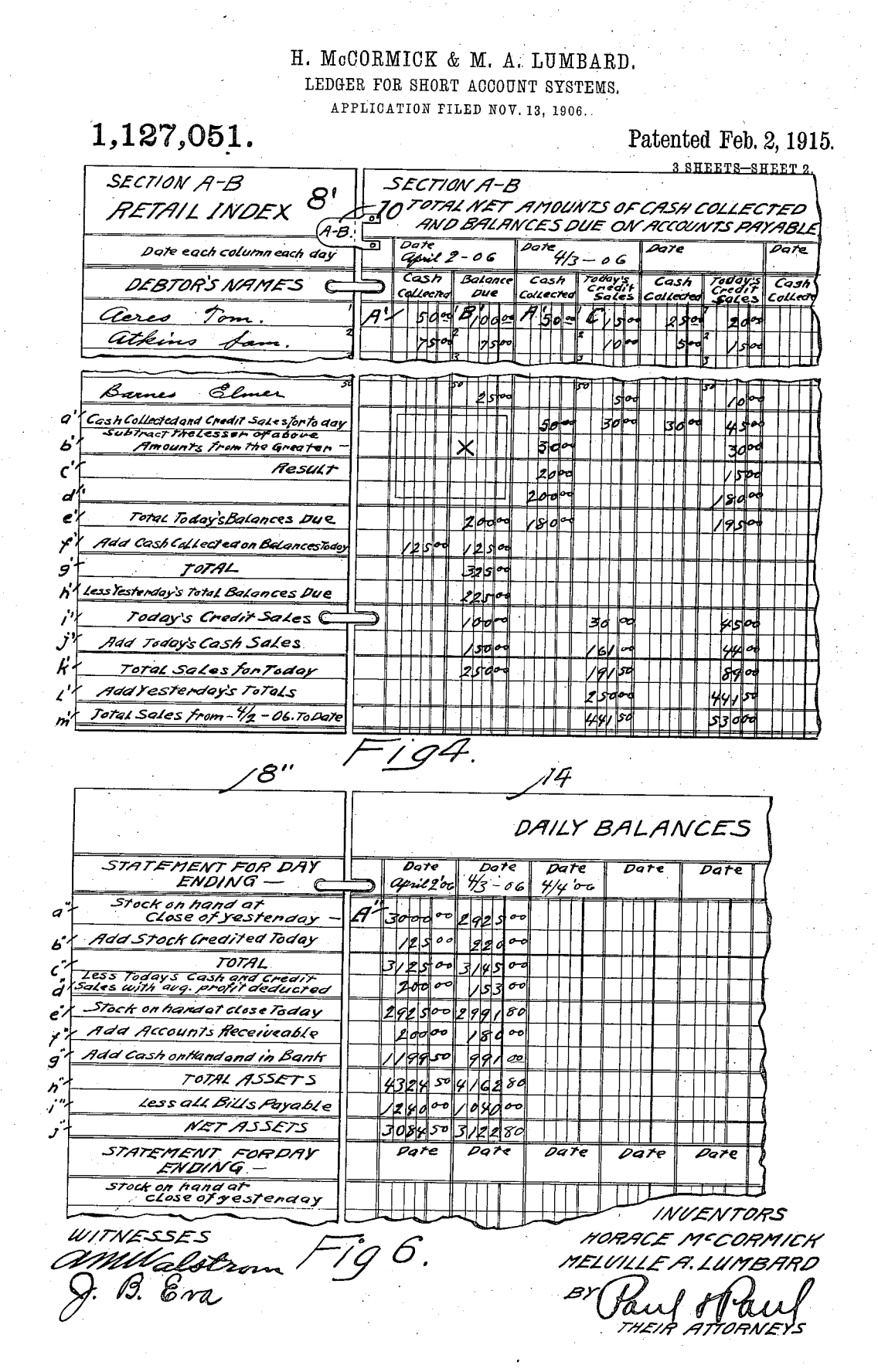

H. McCORMICK & M. A. LUMBARD.
LEDGER FOR SHORT ACCOUNT SYSTEMS.
APPLICATION FILED NOV. 13, 1906.

1,127,051. Patented Feb. 2, 1915.

3 SHEETS—SHEET 2.

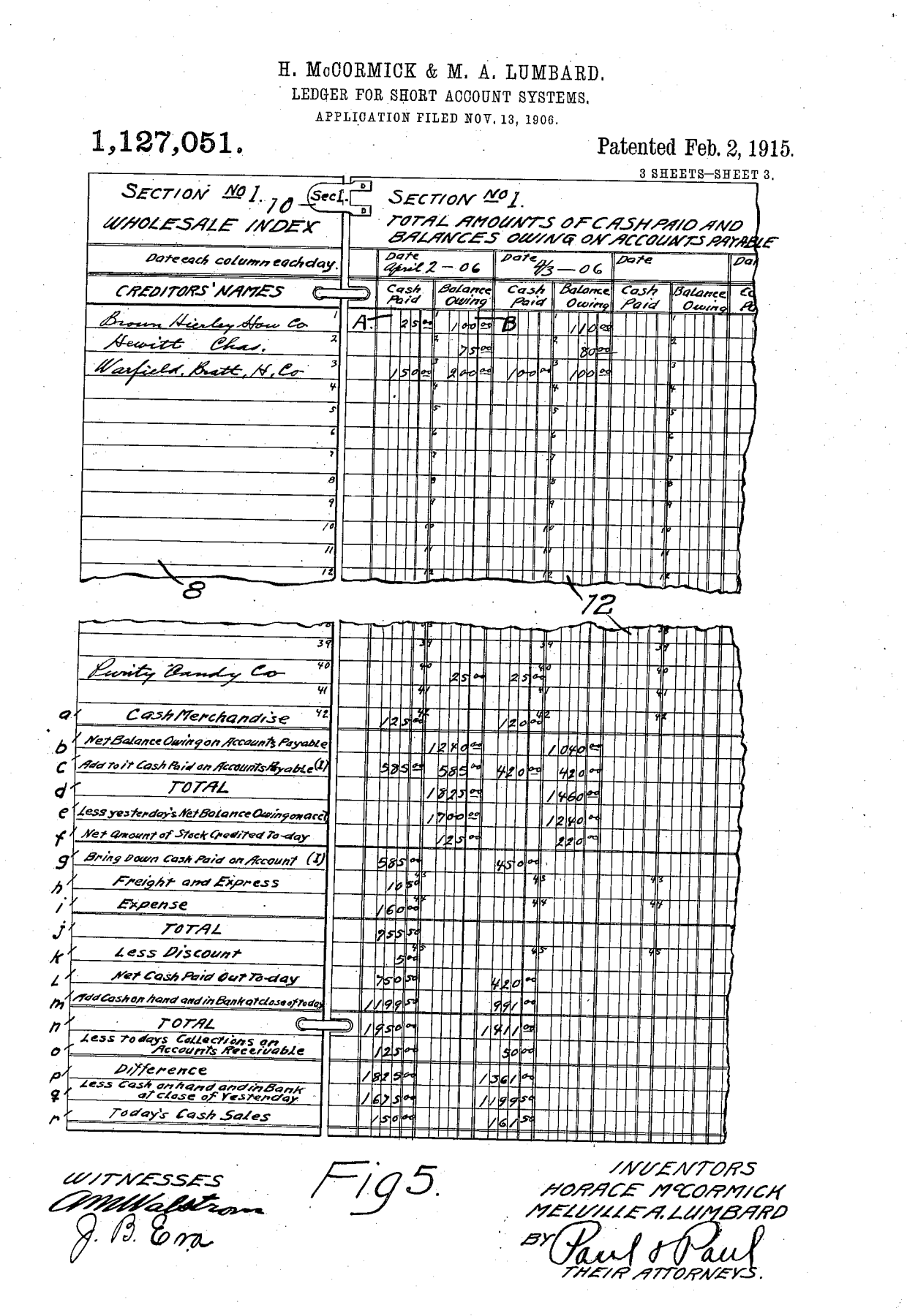

H. McCORMICK & M. A. LUMBARD.
LEDGER FOR SHORT ACCOUNT SYSTEMS.
APPLICATION FILED NOV. 13, 1906.

1,127,051.

Patented Feb. 2, 1915.

3 SHEETS—SHEET 3.

Fig 5.

WITNESSES

INVENTORS
HORACE McCORMICK
MELVILLE A. LUMBARD
BY Paul & Paul
THEIR ATTORNEYS.

UNITED STATES PATENT OFFICE.

HORACE McCORMICK AND MELVILLE A. LUMBARD, OF DES MOINES, IOWA.

LEDGER FOR SHORT-ACCOUNT SYSTEMS.

1,127,051.  Specification of Letters Patent.  Patented Feb. 2, 1915.

Application filed November 13, 1906. Serial No. 343,237.

*To all whom it may concern:*

Be it known that we, HORACE MCCORMICK and MELVILLE A. LUMBARD, of Des Moines, Polk county, Iowa, have invented certain new and useful Improvements in Ledgers for Short-Account Systems, of which the following is a specification.

Our invention relates to systems of accounts where a file is kept for each customer and duplicate sale slips put in the files after each purchase, and entries made therein with each cash payment, so that an individual account is kept in the file with each customer, the totals and balances being transferred daily either from the slips themselves or from a suitable registering device to a ledger designed particularly for keeping such accounts.

The object of our invention is to provide a ledger whereby the labor of keeping an accurate record of such individual accounts will be greatly simplified and shortened.

A further object is to proivde a ledger by means of which the merchant using a short account system can easily determine the status of his business each day and whether it has been conducted at a profit or loss, and preserve the records in case of the loss of the cabinet and its contents by fire.

The invention consists generally in a ledger of the arrangement and construction substantially as shown in the drawings and described in the claims.

In the accompanying drawings, forming part of this specification, Figure 1 is a perspective view of a short account ledger embodying our invention. Fig. 2 is an end view of the ledger closed. Fig. 3 is a detail view illustrating the device for holding the name or index strips on the edge of the ledger leaves. Fig. 4 is a view of a ledger leaf used for the entries in retail trade. Fig. 5 is a view of a ledger leaf used for the accounts of the merchant with the jobbers or wholesalers. Fig. 6 is a view of a portion of the page wherein the statement is prepared of the day's business, and showing the daily balances.

In the drawing, 2 represents the ledger cover containing a series of leaves whereon the various entries are made and which we will later describe in detail. At one longitudinal edge of the cover we provide a series of metal loops 4 having threaded ends 5 which extend through the cover and are provided with thumb nuts 6 by means of which the loops are held in place. The ends of the loops opposite the ends 5 bear on the edge of the cover and when the thumb nuts are loosened and the loops swung around, are the ends may be inserted into holes 7 provided at intervals near the inner edges of narrow index sheets 8 upon which the names of the creditors or debtors are written on cross rulings arranged to coincide with similar rulings on the ledger pages.

We do not wish to be confined to the particular means employed for hinging the index sheets on the ledger cover as various devices may be used for this purpose.

The index sheets for the wholesale accounts we will designate by reference numeral 8 and the corresponding sheets for the retail or customers' account by 8'. These sheets will be mounted together on the loops and swung outwardly from beneath the leaves as required, a little recess or pocket 11 being formed in the cover to receive the sheets without increasing the thickness of the book. The customers' names are opposite the horizontal rulings on the ledger leaves and when the ledger is opened any one of the sheets may be swung outwardly on the loops until the customers' names are visible. The proper entry can then be made on the ledger page for that creditor's or customer's account opposite the corresponding number on the index sheet. The number of index sheets used, will depend of course, upon the size of the business, and preferably the horizontal rulings of the sheets and the pages of the ledger have numbers running from 1 to 50 covering certain letters of the alphabet on each sheet and page, The wholesale index will have the following notation at the top "Section No. 1, wholesale index", then follows a list of the creditors' names and numbers corresponding with the numbers on the files used for the creditors' accounts in the cabinet, with whom the merchant does business. Suitable tabs 10 are provided on the ledger leaves 12 wherein the entries for the wholesale accounts are made. At the top of the ledger page appears the following:—"Total amounts of cash paid and balances owing on accounts payable". The page is divided into a series of vertical columns A and B with headings of "Cash paid" and "Balance owing", and a blank space for the date, two columns being used for each day. In the column A the cash paid the wholesaler is entered and in the next column the balance due is shown. The creditors' accounts are carried across the ledger page in this way each day showing the amount paid out by the merchant and the balance due the individual creditors, a slip will be made out each time an invoice is entered or a check drawn, and placed in the file in the cabinet and the items taken off by the clerk from the slips and entered in the ledger so that the merchant by glancing at the ledger page can easily determine the amount paid each day to the wholesalers and the balances due them for previous purchases.

At the bottom of the page a series of horizontal spaces are provided indicated on the drawings, by reference letters $a$ to $r$ inclusive, and in which horizontal spaces the following lettering appears:—

$a$—"Cash merchandise".
$b$—"Net balance owing on accounts payable".
$c$—"Add to it cash paid on accounts payable".
$d$—"Total".
$e$—"Less yesterday's net balance owing on account".
$f$—"Net amount of stock credited to-day".
$g$—"Bring down cash paid on account".
$h$—"Freight and express".
$i$—"Expense".
$j$—"Total".
$k$—"Less discount".
$l$—"Net cash paid out to-day".
$m$—"Add cash on hand and in bank at close of to-day".
$n$—"Total".
$o$—"Less to-day's collections on accounts receivable".
$p$—"Difference".
$q$—"Less cash on hand and in bank at closing of yesterday".
$r$—"To-day's cash sales".

Under April 2nd opposite the cash merchandise notation, we will enter the amount representing the purchase from the wholesaler on that day, the same being arbitrarily illustrated in the drawing by the figures $125.00 and on the 3rd we will enter in the corresponding column the amount of $120.00. The items $1240.00 and $1040.00 opposite the next horizontal space are arbitrary and presumed to be made up of a series of items not shown on this sheet, being merely used for the purpose of illustration.

Opposite the next space $c$ are the amounts $585.00 and $420.00 which it is assumed represent the cash paid by the merchant to his creditors on the 2nd and 3rd of April.

Opposite space $d$ $1825.00 and $1460.00 represent the sum of the balance owing and the cash paid.

$1700.00 opposite space $e$ represents the amount owed yesterday and this deducted from the $1825.00 total leaves $125.00 or the value of the stock bought to-day.

Continuing the illustration and referring particularly to vertical column A, we find opposite space $g$ $585.00 representing the cash paid on account. Add to this opposite $h$ and $i$ the freight and express and expenses and we have a total opposite space $j$ of $755.50. Deducting discount ($5.00) we have opposite space $l$ $750.50 the net cash paid out on that date. The $585.00 representing the cash paid on the 2nd of April includes the discount and must be deducted to determine the net cash paid out on that day. The amount of the discount can be ascertained from the discount file.

Opposite space $m$ we have $1199.50 representing the cash on hand and in the bank at the close of the day's business. This added to the cash paid out gives us a total of $1950.00.

Our wholesale sheet shows opposite space $o$ today's collections on accounts receivable amounting to $125.00 and a difference opposite space $p$ of $1825.00. Deducting from this the cash on hand and in the bank at the close of yesterday's business $1675.00, we have opposite space $r$ $150.00 representing to-day's cash sales. These figures will be utilized in explaining the manner of using the retail or customers' sheet.

Referring now to Fig. 4 and the retail index sheet 8', we find at the top of the sheet the lettering "Section A—B retail index," and a tab corresponding to the one described, bearing letters "A—B" and indicating that the initial letters of the surnames written on the index sheet include those customers whose names begin with A and B. Below the heading of the index sheets which are mounted on the loops in the same manner as the wholesale index sheets, are spaces for the customers' names and numbers corresponding to those described with reference to the wholesale sheet and to the numbers on the respective files in the cabinet. The numbers run down the margin of the index slips or sheets and the ledger pages between the columns for cash collected and the day's credit sales and extend across the ledger to facilitate the entry of items in the different accounts as they are extended over the page away from the index sheets. At the bottom of the retail index sheets a series of horizontal spaces are formed which we will designate by the same reference numerals as the corresponding spaces on the wholesale index sheets with the addition of prime mark, the following lettering appearing in these spaces:—

$a'$—"Cash collected and credit sales for to-day."
$b'$—"Subtract the lesser of the above amounts from the greater."
$c'$—"Result."

$d'$—"If cash collected is greater than credit sales deduct the difference from yesterday's total balance. If credit sales are greater than cash collected add the difference to yesterday's total balance due." This lettering under reference letter "$d$" is omitted from the drawing for lack of space. It will be understood, however, that in the printed book the lettering will appear in the blank opposite the space.

$e'$—"Total to-day's balance due."
$f'$—"Add cash collected on balances due to-day."
$g'$—"Total."
$h'$—"Less yesterday's total balances due."
$i'$—"To-day's credit sales."
$j'$—"Add to-day's cash sales."
$k'$—"Total sales for to-day."
$l'$—"Add yesterday's totals."
$m'$—"Total sales from April 2—1906 to date."

The vertical columns which we will group two under each day, are indicated by letters A' and B' and have at the top the day of the month, one column representing the cash collected and the other the total balance due. The next day will have also, a column for the cash collected and one designated by letter C wherein the credit sales for the day are entered, being headed "To-day's credit sales."

The columns A' and C will be continued preferably for a period of ten days and then another total balance column will be provided. The total balances are taken from the files in the cabinet and entered in these columns and the addition verified from the addition of the slip in the registering machine. The ledger is preferably of such size that the total balance column will be the second one at the left hand edge of the page. In these columns A', B' and C, the bookkeeper will enter the separate items of cash collected from the customer, his daily purchase or purchases and at intervals of ten days ascertain the exact balance due from each customer, by taking from each file the total balance as shown on its face.

In the blank marked X on the page, we prefer to have printed the following:—
"The day you start this book and thereafter at intervals of ten days, take off your customers' full balances, using only the space below this square, the intervening nine days take all cash collected from all customers and only the amount each customer trades. See sample sheet and directions in back of this book."

At the bottom of the page opposite the space "Cash collected and credit sales for to-day," appears "$50.00 under date of April 3rd. and $30.00 the total of the credit sales on that day. Subtracting the lesser amount from the greater, we have $20.00 to be deducted from $200.00 the total balances due, leaving $180.00 total balance due on the 3rd after one day's business. On April 2nd $125.00 was collected. This added to the balances due gives us a total of $325.00 opposite space $g$. Deducting yesterday's total balances due, which we will assume to be $225.00, we have $100.00 representing to-day's credit sales. Add the cash sales $150.00 from wholesale sheet and we have $250.00 as the total sales for April 2nd opposite space $k$. On the 3rd, opposite the space $j$ and to-day's credit sales, we find $30.00 representing the total of the credit sales for that day, to which we add $161.50 cash sales from wholesale sheet, making the total of the sales for the day $191.50 to which we add $250.00 yesterday's totals, giving us $441.50 the total sales from the 2nd to the close of business on the 3rd. This system is continued across the pages of the book, each customer's account being shown in detail with a daily statement of the receipts and sales.

In Fig. 6 we have illustrated a page 14 of the ledger having an index sheet 8", having a heading "Statement for day ending April 2nd, 3rd, 4th," etc., as the case may be. Then follows a series of horizontal spaces indicated by reference numerals $a$ to $j$ with the addition of the double prime mark. The spaces contain respectively the following lettering:—

$a''$—"Stock on hand at close of yesterday."
$b''$—"Add stock credited to-day."
$c''$—"Total."
$d''$—"Less to-day's cash and credit sales with avg. profit deducted."
$e''$—"Stock on hand at close of to-day".
$f''$—"Add accounts receivable".
$g''$—"Add cash on hand and in bank".
$h''$—"Total assets".
$i''$—"Less all bills payable".
$j''$—"Net assets".

On the ledger page a vertical column A" is provided for each day of the week and assuming that the business began the 2nd day of April and the stock inventoried $3000.00 on that day, we add to that opposite space $b''$ $125.00 or stock purchased as per the wholesale ledger account and find a total of $3125.00 opposite space $c$. Deducting from this amount the day's cash and credit sales less 25 per cent. approximately the average profit, we have $2925.00 stock on hand at the close of the first day's business. The profit of course, will vary with the different lines of business. In general merchandising, however, it is fair to assume that the merchant will make a profit of 25 per cent. on the purchase price of the goods and for the purpose of illustration we use this percentage. To this amount $2925.00 we add the total of the balances due from customers $200.00, also the cash on hand and in the bank from wholesale sheet 5 and find a total of $4324.50. Deducting from this $1240.00 bills payable, we have $3084.50 net assets at the end of the first day's business.

On the second day, the amount representing the stock on hand at the close of the first day is entered at the head of the column as shown in Fig. 6, then the purchases for that day are added and the operation last described repeated until we find opposite space $j''$ the net assets at the end of two days business $3122.80. Deducting the assets at the end of the first day's business, shows a gain of $38.50 or one-fifth approximately, of the total sales for the second day's business.

It must be understood that the ledger described is used in connection with a cabinet wherein the duplicate sale slips files are kept, slips being made not only when a customer makes a purchase or pays something on account, but also when the merchant buys goods of his wholesaler or draws a check in payment of the same.

To prove the work, the difference between the net assets of the second and third days, assuming that there are no errors, must equal the gross profits on the sales. To illustrate, $3122.80 represents the net assets on the third day, $3084.50 the net assets on the second day, the gain being $38.30. The sales amount to $191.50 as shown by the retail sheet and if the merchant has made 25 per cent. profit on the cost price of his goods, it will be equal to one-fifth of the selling price and one-fifth of $191.50 equals $38.30 the difference between the net assets of the two days business. In case there have been on 3rd day some items of expense and discount then the difference between the net assets of the two days plus the expense items less the discount, must equal the gross profits for the day's sales.

We claim as our invention:—

An account ledger having leaves provided with horizontal and vertical rulings forming a series of vertical and horizontal columns designated for the customers' accounts, there being vertical columns suitably designated for the cash collected and the balance due at the left hand side of the page and suitably designated vertical columns for the cash collected and the day's credit sales toward the right, and index strips provided at the left hand edge of the page having suitably designated horizontal columns in alinement with those of the ledger page, the lower portion of the index strips being suitably designated opposite the horizontal columns of the ledger page for the totals of the customers' accounts and a statement of the day's business.

In witness whereof, we have hereunto set our hands this 18th day of October 1906.

HORACE McCORMICK.
MELVILLE A. LUMBARD.

Witnesses:
RICHARD PAUL,
J. B. EVA.